United States Patent [19]

Marquardt

[11] Patent Number: 5,598,997
[45] Date of Patent: Feb. 4, 1997

[54] RAIL SECTION FOR A CONTAINER OF AN OXYGEN SUPPLY UNIT

[75] Inventor: Wolfgang Marquardt, Stockelsdorf/FRG, Germany

[73] Assignee: Drägerwerk AG, Lübeck, Germany

[21] Appl. No.: 300,716

[22] Filed: Sep. 2, 1994

[30] Foreign Application Priority Data

Sep. 7, 1993 [DE] Germany .............. 43 30 209.2

[51] Int. Cl.⁶ ........................................ B65D 8/00
[52] U.S. Cl. .................. 248/225.21; 244/118.5; 248/227.4; 248/311.3
[58] Field of Search .............. 248/225.21, 307, 248/223.41, 225.11, 311.3, 312.1, 339, 340, 341, 318, 202.1, 227.4, 215; 224/311; 220/751, 482, 476, 477; 244/118.5

[56] References Cited

U.S. PATENT DOCUMENTS

| | | | |
|---|---|---|---|
| 3,071,350 | 1/1963 | Opie | 248/224.2 X |
| 3,366,199 | 1/1968 | Cahn | 244/118.5 X |
| 4,023,874 | 5/1977 | Jong et al. | 244/118.5 X |
| 4,510,872 | 4/1985 | Parry | 248/340 X |
| 4,786,023 | 11/1988 | Harris et al. | 248/311.2 X |
| 4,840,171 | 6/1989 | Röhling et al. | 128/204.18 |
| 4,869,378 | 9/1989 | Miller | 248/225.1 X |
| 4,909,464 | 3/1990 | Levine et al. | 248/225.1 |
| 5,078,343 | 1/1992 | Howlett | 244/118.5 |
| 5,358,139 | 10/1994 | Schnoor et al. | 220/669 |

FOREIGN PATENT DOCUMENTS

4140266C1   3/1991   Germany .

*Primary Examiner*—Karen J. Chotkowski
*Attorney, Agent, or Firm*—McGlew and Tuttle

[57] ABSTRACT

A rail section on a container of an oxygen supply unit for hanging the container into a mount in an aircraft. Hook parts on the end tips of the rail section are provided, which end tips project from the container and engage the mount on a first contact zone (10). A subsequent alignment of individual containers to a uniform alignment becomes unnecessary, and displacement of the containers in relation to the mount (5), which may be due to the operation of the aircraft, is not possible. To achieve this object, the hook part has a projection, which supports the rail section in a preselected angular position in relation to the mount, and which is supported by a second contact zone in the area of the inner surface of the mount.

13 Claims, 1 Drawing Sheet

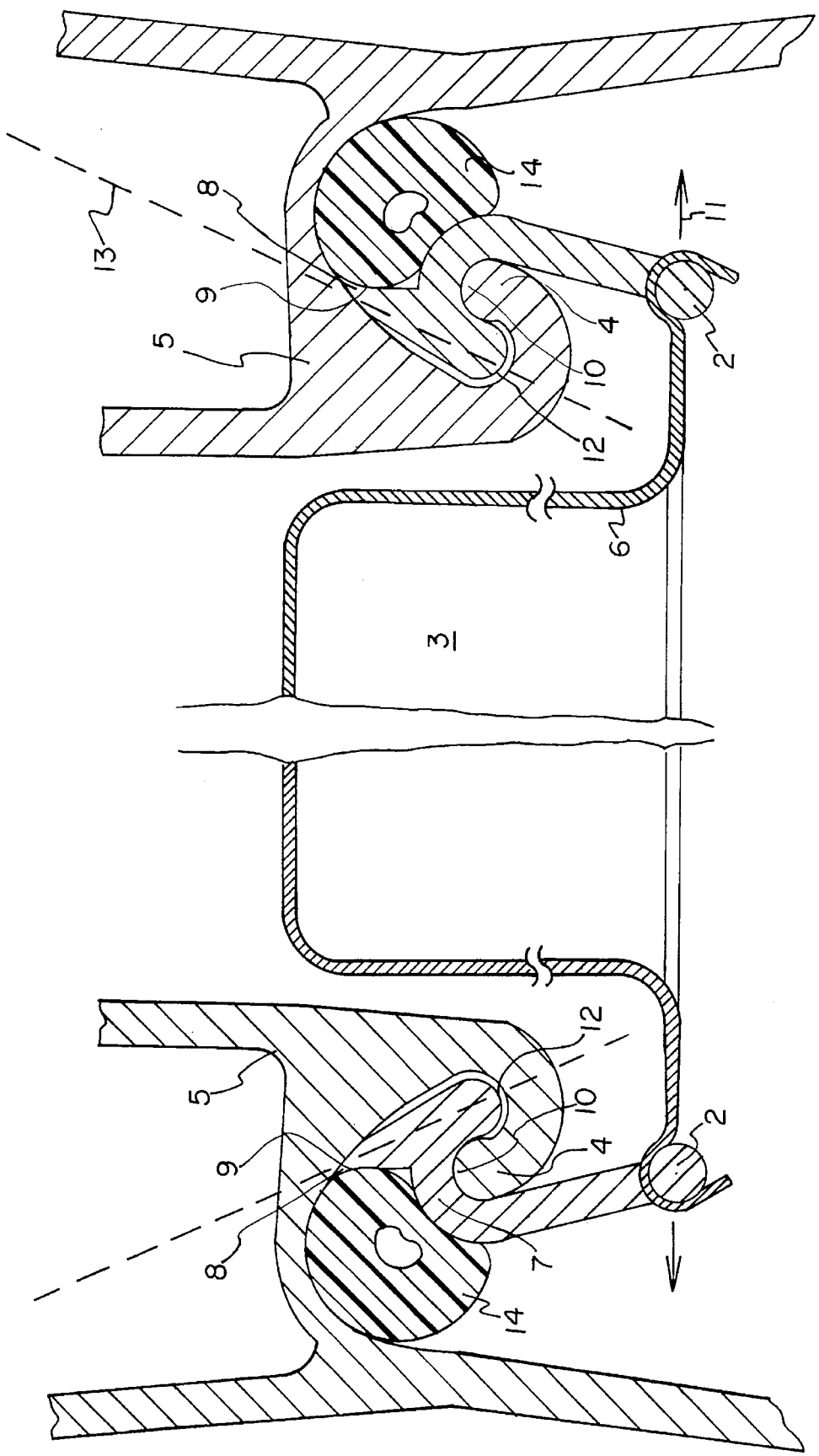

RAIL SECTION FOR A CONTAINER OF AN OXYGEN SUPPLY UNIT

FIELD OF THE INVENTION

The present invention pertains to a rail section on a container of an oxygen supply unit for hanging the container in a mount in an aircraft, with hinges for the articulated connection of the rail section to at least one of two opposite sides of the container, and with hook parts at the end tips of the rail section, which hook parts project from the container and engage the mount in a first contact zone.

BACKGROUND OF THE INVENTION

A rail section for installing a container of an oxygen supply unit in an aircraft has become known from DE-C 41 40 266. The prior-art rail section is arranged in an articulated manner on two opposite sides of the container and is bent over in the shape of a hook at the ends projecting from the container in order for the container of the oxygen supply unit to be able to be hung in a mount on the ceiling structure of the aircraft with the hook part of the rail section thus formed. The mount is designed as a mount sectional rail, and it also has a hook-shaped end piece, which engages the hook part of the rail section in the installed position of the container. To fix the hook part in relation to the hook-shaped end piece, an elastic, tube-like bead is placed into the mount sectional rail, and this bead is pressed in after the container of the oxygen supply unit has been hung into the mount sectional rail, and to remove the housing, it is simply pulled out of the mount sectional rail, as a result of which the complete oxygen supply unit can be removed from the ceiling structure without tools.

Since the oxygen supply units are assigned to individual rows of passenger seats, a plurality of containers as well as spacing elements between the containers are fastened in alternating sequence on the mount sectional rail extending in the longitudinal direction of the aircraft. The spacing elements have the same rail sections as do the containers. Due to the articulated connection of the rail sections to the containers and due to the equally articulated engagement of the hook parts of the rail sections with the hook-shaped end pieces of the mount sectional rail, lateral displacement of the individual containers in relation to one another, or of the containers in relation to the spacing elements may occur. To obtain a uniform alignment, the containers and the spacing elements must be aligned individually manually. The angular position of the rail sections located at the containers and at the spacing elements in relation to the mount sectional rail will now change, i.e., an approximately uniform angular position will be set at the rail sections during the alignment. The installation of the oxygen supply units in the ceiling structure is made difficult by this additional effort needed for mounting.

SUMMARY AND OBJECTS OF THE INVENTION

The primary object of the present invention is to improve a rail section of the above-described type such that the installation of the containers and spacing elements in the corresponding mount sectional rail in the aircraft will be facilitated.

This object is attained by the hook part having a projection, which supports the rail section in a preselected angular position in relation to the mount and is supported by a second contact zone in the area of the inner surface of the mount.

The advantage of the present invention is essentially the fact that due to the projection located at the hook part of the rail section, the rail section is held in a preselected angular position in relation to the mount, and this is achieved by the projection being supported on the inner surface of the mount, as a result of which the position of the container in relation to the mount is fixed. The dimension of the angular position can be influenced by the length of the projection or the mounting position in the area of the hook part. The projection may be in the form of a dog or a bead, or it may be a pin fastened in the hook part, directed toward the inner surface of the mount.

The invention further provides that the projection is located essentially in alignment pointing toward the end tip of the hook part. The hook part has, together with the projection, at least partially a T-shaped cross-section contour.

In an advantageous embodiment that can be prepared at low cost, the projection is positioned such that it is located essentially in alignment, pointing toward the end tip of the hook part. The hook part of the rail section is advantageously prepared together with the projection as a T-shaped cross section contour.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only figure is a cross-sectional view showing the connection of the rail section with the container and the connection of the rail section with a mount sectional rail of the ceiling structure of the aircraft.

DETAILED DESCRIPTION OF THE PREFERRED EMBODIMENT

Referring to the drawing in particular, a rail section 1 is shown with a hook part or rail hook 7 which terminates in an end tip 12 and is hung onto a likewise hook-shaped end piece or mount hook 4 of a mount sectional rail 5. The mount sectional rail, hereinafter called the mount rail or just mount 5, is part of a ceiling structure of the aircraft, not shown in the figure. The container 3, only a detail of which is shown in the figure, contains an oxygen supply unit, which is likewise not shown in the figure (a similar container is shown in U.S. application Ser. No. 07/985,882 which is hereby incorporated by reference). The rail sections 1 are arranged on the container 3 by means of a hinge 2 on two opposite sides 6 of the container, but only the right-hand side 6 of the container is shown in the figure. The left-hand side of the container has a laterally reversed design compared with the right-hand side of the container. Within the hook part 7, the rail section 1 has position means including a projection 8 which projects from the hook part 7 in the manner of a dog. The projection 8 is directed toward the inner surface of the mount rail 5, and is in contact with the inside of the mount rail 5 at a second contact zone or mount 9. The hook part 7 is supported on the end piece 4 in a first contact zone 10. The fixation of the rail section 1 in a preselected angular position can be illustrated as follows. If, for example, a force acts on the hinge 2 of the rail section 1 in the direction of the arrow 11, the rail section is held in the angular position shown as a consequence of support on the contact zones 9, 10. If a force acts in the opposite direction, the container 3 is supported by the rail section, not shown in the figure, on the left-hand side of the container. The geometric site of the second contact zone 9 is determined essentially by the length and the positioning of the projection 8 within the hook part 7. In the embodiment shown in the figure, the projection 8 lies in alignment 13, pointing toward the end tip 12 of the hook part 7. The rail section 1 is fixed within the mount rail 5 by a tube-like bead means 14, which presses the rail section 1 against the contact zones 9, 10.

While a specific embodiment of the invention has been shown and described in detail to illustrate the application of the principles of the invention, it will be understood that the invention may be embodied otherwise without departing from such principles.

What is claimed is:

1. A hanging assembly for an aircraft oxygen supply unit comprising:

a container of the aircraft oxygen supply unit;

a hinge having one part connected to said container and another part pivotable with respect to said one part;

a rail section connected to said another part of said hinge, said rail section including a rail hook a mount including a mount hook and a mount contact zone, said mount hook having an inside and an outside, said outside of said mount hook facing said hinge, said rail hook being engagable with said mount hook by engaging rotation of said rail hook from a position outside said mount hook to a position inside said mount hook;

position means mounted on said rail hook and contactable with said mount contact zone to block engaging rotation of said rail hook at an angular position, said angular position being a preselected hanging position of said container, said position means includes a projection, a size and location of said projection on said rail hook being designed to set said angular position, said rail hook includes a curved section and a tip, said tip extends tangentially from an end of said curved section, said projection of said position means is attached to said curved section and substantially aligned with said tip, said tip and said projection form a line which is angularly spaced from a hanging direction of said container.

2. An according to claim 1, wherein the projection is located essentially in alignment pointing toward the tip of the rail hook.

3. An assembly according to claim 2, wherein the rail hook and the rail section have a J-shape, and said rail hook cooperates with the projection to provide a substantially T-shape cross-sectional contour.

4. An assembly according to claim 1, wherein the rail hook cooperates with the projection to provide a substantially T-shape cross-sectional contour.

5. An assembly in accordance with claim 1, wherein:

said mount and said rail section having a shape for receiving a bead means and said bead means being for blocking movement of said rail hook out of said mount hook.

6. An assembly in accordance with claim 1, wherein:

said rail section and said mount is shaped to cooperate with said hinge to cause said rail hook to rotate about said hinge and engage with said mount hook while maintaining said container in a fixed position.

7. An assembly in accordance with claim 1, wherein:

another mount, similar to said mount, is spaced from said mount, said another mount including another mount hook and another mount contact zone;

said container is positioned between said mount and said another amount;

said one part of said hinge is connected to a first side of said container;

another hinge, similar to said hinge, has one part connected to a second side of said container;

another rail section is connected to said one part of said another hinge, said another rail section including another rail hook, said another rail hook being engagable with said another mount hook by engaging rotation of said rail hook from a position outside said mount hook to a position inside said mount hook;

another position means mounted on said another rail hook and contactable with said another mount contact zone to block engaging rotation of said another rail hook at another angular position, said another angular position being a preselected hanging position of said container.

8. An assembly in accordance with claim 7, wherein:

said first and second sides of said container are on substantially opposite sides of said container.

9. An assembly in accordance with claim 7, wherein:

said engaging rotation of said rail hook is substantially opposite said engagable rotation of said another rail hook.

10. An assembly in accordance with claim 9, wherein:

said angular position and said another angular position define a predetermined position of said container between said mount and said another mount.

11. An assembly in accordance with claim 7, wherein:

said position means and said another position means cooperate to lock said container in a predetermined position between said mount and said another mount.

12. An assembly in accordance with claim 1, wherein:

said position means cooperates with said rail hook to block engaging rotation of said rail hook at said angular position.

13. An assembly in accordance with claim 1, wherein:

said mount is mounted on a ceiling structure of an aircraft.

\* \* \* \* \*